United States Patent [19]

Yoder

[11] Patent Number: 4,495,388
[45] Date of Patent: Jan. 22, 1985

[54] BIN LEVEL DETECTOR AND FILLING SWITCH

[76] Inventor: David A. Yoder, 30 Cedar Park Blvd., SW., Pataskala, Ohio 43062

[21] Appl. No.: 624,272

[22] Filed: Jun. 25, 1984

Related U.S. Application Data

[63] Continuation of Ser. No. 503,587, Jun. 13, 1983, abandoned.

[51] Int. Cl.³ ............................................. H01H 35/00
[52] U.S. Cl. ................................................. 200/61.21
[58] Field of Search .................. 200/61.2, 61.21, 67 F, 200/61.83, 81.9 M; 335/205; 340/603, 606, 610, 612, 617

[56] References Cited

U.S. PATENT DOCUMENTS

| 2,307,304 | 1/1943 | Rudd | 200/81.9 M |
|---|---|---|---|
| 2,520,500 | 8/1950 | Gray | 200/61.21 |
| 2,555,513 | 6/1951 | Schweitzer, Jr. | 335/205 X |
| 2,745,920 | 5/1956 | Keephart | 200/61.21 |
| 3,325,756 | 6/1967 | Maxwell | 200/67 F |
| 3,349,203 | 10/1967 | Wolford | 200/61.21 X |
| 3,368,045 | 2/1968 | Harper | 200/81.9 M |
| 3,569,648 | 3/1971 | De Meyer | 200/81.9 M |
| 3,951,309 | 4/1976 | Kadowaki | 200/61.2 X |
| 4,282,413 | 8/1981 | Simons | 340/610 X |

FOREIGN PATENT DOCUMENTS

| 259751 | 4/1912 | Fed. Rep. of Germany | 340/617 |
| 933555 | 9/1955 | Fed. Rep. of Germany | 200/81.9 M |

Primary Examiner—J. R. Scott
Attorney, Agent, or Firm—Frank H. Foster

[57] ABSTRACT

A bin level detector and filling switch operates in response to a pulverulent, fluent material spilling over the top of a vertically mounted tube open at both ends. The upper and lower ends of the tube correspond respectfully to the points at which the bin is to stop and start being filled. As the material fills the tube it depresses a movable plate holding a first magnet. A second magnet is oriented with respect to the first magnet with like poles opposite and is mounted outside of the vertical tube and positioned so that movement of the one magnet results in a reciprocal movement of the other magnet. The movement of the second magnet is utilized to operate a control device in response to the level of pulverulent fluent material in the bin. The control device may be an electrical switch that effects or operates the filling mechanism of the bin, an alarm device or some other satellite function.

6 Claims, 5 Drawing Figures

BIN LEVEL DETECTOR AND FILLING SWITCH

This application is a continuation of application Ser. No. 503,587, filed June 13, 1983, now abandoned.

TECHNICAL FIELD OF THE INVENTION

The present invention relates generally to devices for detecting the level of a pulverulent fluent material in a bin and in response to that level controlling another mechanism.

BACKGROUND OF THE INVENTION

Devices proposed in the prior art for detecting the level within a bin of a pulverulent fluent material have used mechanical linkages and movable parts within the bin to operate an electrical switch that in turn operates a filling mechanism or a warning device such as an alarm or light. Such devices offered as optional equipment for bins require the manufacture and assembling of a number of parts which must then be fitted into the bin level detector. This adds expense to the overall production of the bin. Such devices are at least partially located within the bin and operate in response to the pressure of the particular pulverulent, fluent material to be contained within the bin. Gravel and feed grain products are examples of such materials. The flow of such materials generates an abundance of dust and particulate material within the atmosphere of the bin. This dust and particulate material frequently foul or damage the mechanical linkages and movable parts present in previous devices preventing proper operation. Damage of this sort is often expensive to repair and can lead to secondary damage to filling mechanisms that are not shut off when the bin is full. A recurring example of such damage arises when a bin is full and a damaged switch does not shut off an electrical motor operating a feeding auger. The auger continues to push grain, feed, or some other material against a full bin until the motor burns up, blows fuses or damages the auger.

BRIEF SUMMARY OF THE INVENTION

The present bin level detector and filling switch operates in response to the level of the pulverulent fluent material to be stored within the bin. The preferred embodiment has a nonferrous vertical tube, open at both of its ends, is positioned within the bin. The top of this tube is situated at approximately the point at which filling of the bin is to be terminated and the lower end of this tube is approximately at the position where refilling of the bin is to commence. When the level of the material stored within the bin reaches the point of the upper end of the vertical tube the material will flow into the tube. Within the tube hanging from a hinge is a plate that is depressed by the downward flow through the tube of the pulverulent fluent material. On this plate is mounted a first magnet biased by a second magnet outside the vertical tube. The magnets are positioned with their like poles opposite one another so that each magnet repulses the other. Gravity or some other means is used to cause the second magnet to move towards the first magnet establishing a bias where the first magnet and plate assume a position closing the tube when pulverulent material is not present in the tube. The presence of the pulverulent material in the tube depresses the plate into an open position. The first magnet then exerts a force through the wall of the tube which repulses the second magnet. The repulsive force exerted upon the second magnet is used to move a lever, plunger or another mechanism attached to a control device such as an electrical switch. The switch may be used to control the initiation or termination of a satellite mechanism such as a warning device or bin filling device.

An important feature of this invention is that it also operates without being present in a vertical tube. An alternative embodiment of the invention has the plate hinged directly to the inside wall of a bin in which a window has been cut. A durable sheet of nonferrous material covers the window and the two magnets bias one another through this sheet. With this embodiment two bin level detector and filling switches are used to control the bin filling mechanism. One switch is placed at a low point in the bin to commence the filling operation when the pulverulent fluent material is below its plate. The shut off of the filling mechanism is controlled by a bin level and detector switch placed high in the bin where filling is to be terminated.

A primary object of the present invention is to provide a means to use the presence of a pulverulent fluent material to operate a control device such as an electrical switch that is capable of being separated from the dusty environment of the bin such as by being encapsulated in a dust proof protective container.

Another object of the present invention is to minimize the abrasive action of the pulverulent material on the moving parts of a bin level detector.

A further object of the present invention is to eliminate mechanical connection between a pressure plate and control device such as an electrical switch and to minimize the number of moving parts in the bin level detector and filling switch which are subject to fouling by dust and particulate matter. This will eliminate a source of jamming and provide a safer more reliable control of satellite mechanisms whose operation are actuated or terminated in response to the level of material within the bin.

Other objects and advantages of the present invention may be appreciated in view of the following drawings and description.

DETAILED DESCRIPTION

Figure 1:
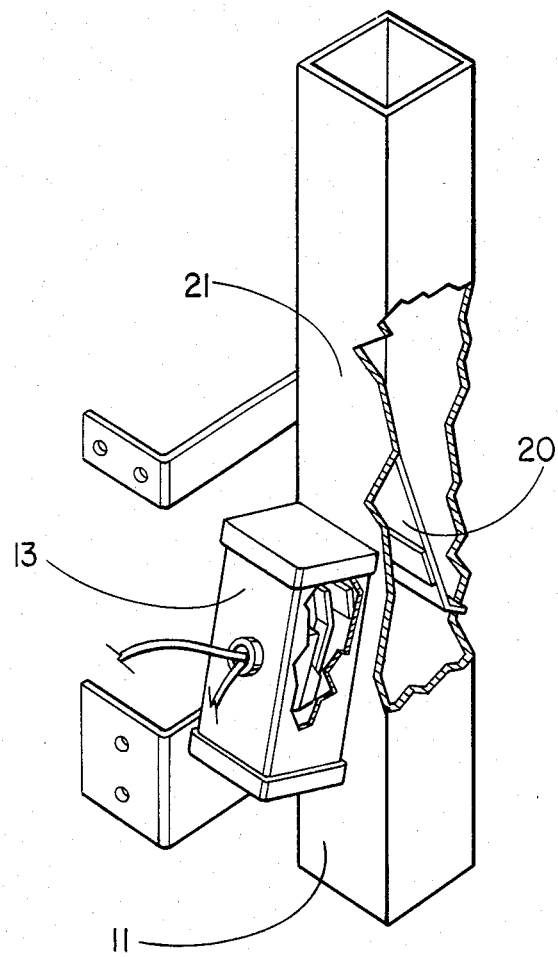
FIG. 1 is a perspective view of a first embodiment of the present bin level detector and filling switch.
Figure 2:
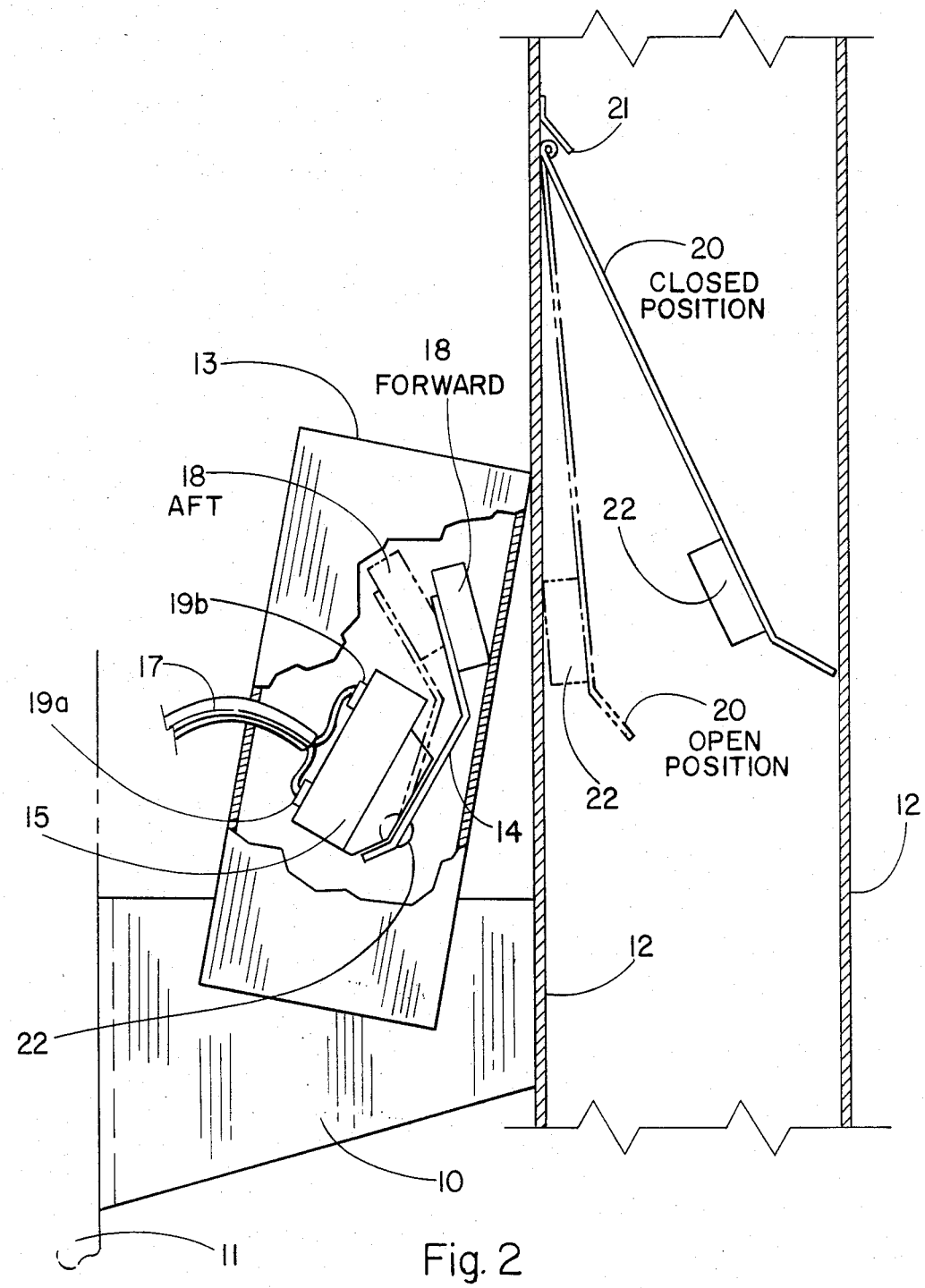
FIG. 2 is a side view in elevation of the embodiment of FIG. 1 with the side portion of the vertical tube and most of the side of the dust proof encasement for the second magnet and control components broken away.

The preferred embodiment illustrated in FIGS. 1 and 2 includes a bracket 10 to hold a tube 12, which is open at both ends, in a vertical position to the inside of the bin wall 11. This bracket 10 may be used to support a dust proof resilient encasement 13 for the control components to be described below.

The vertical tube 12 of nonferrous material supports a plate 20 on its inside by means of a shielded hinge 21.

The plate 20 hangs downwardly from the hinge 21 and is free to swing. Attached to and preferably on the underside of plate 20 below the hinge 21 is a first magnet 22. Plate 20 is positioned opposite the encasement box 13 such that the first magnet 22 swings towards the encasement box 13 to an open position (causing the inner control device to operate) when a pulverulent fluent material is present within the tube 12. When no pulverulent material is present within tube 12, first magnet 22, biased by a second magnet 18, and plate 20 assume a closed position.

Figure 3:
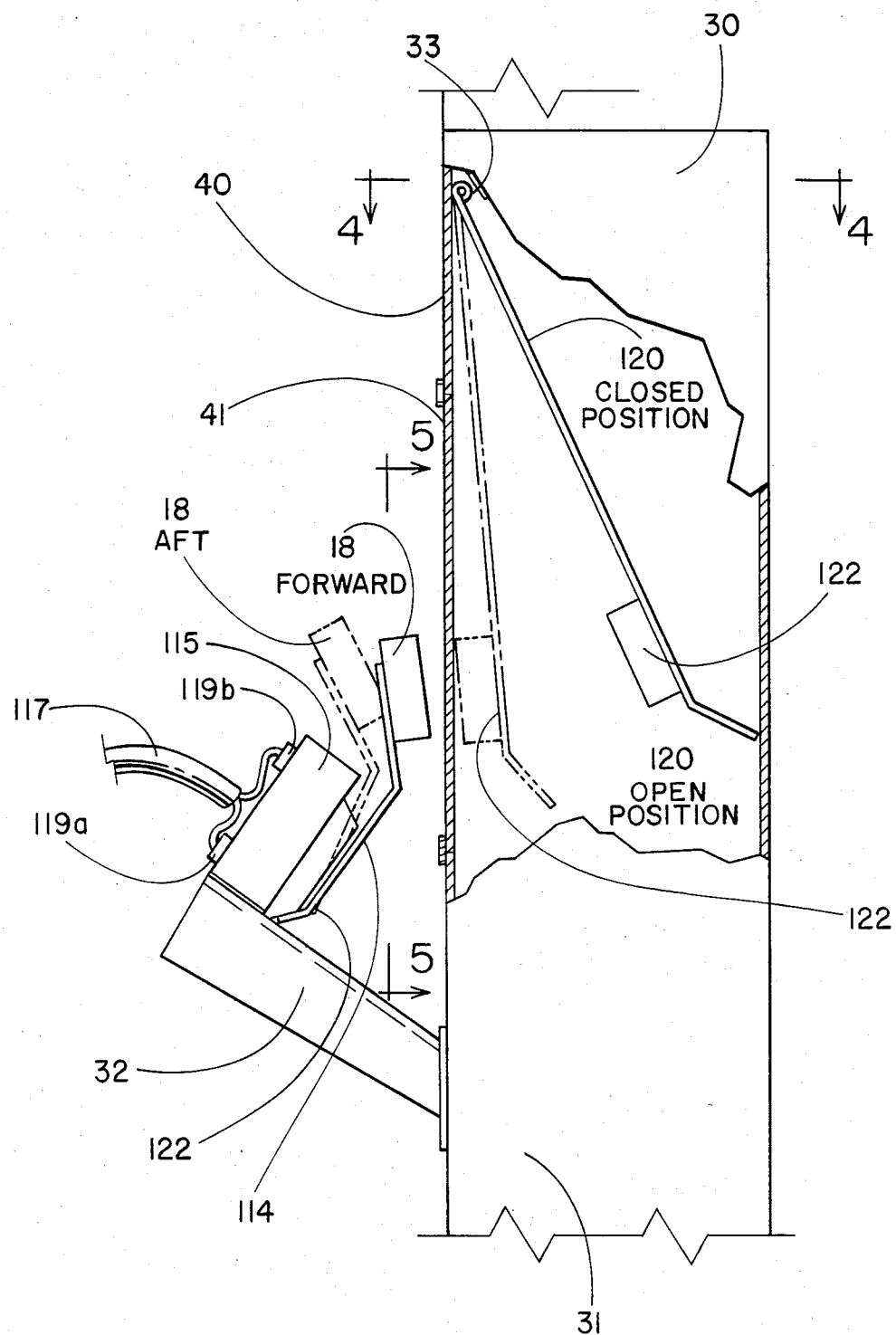
FIG. 3 is a side view in elevation of the second embodiment of the device with most of the side portion of the vertical tube cut away and showing the second magnet and control components on the exterior of the bin.
Figure 4:
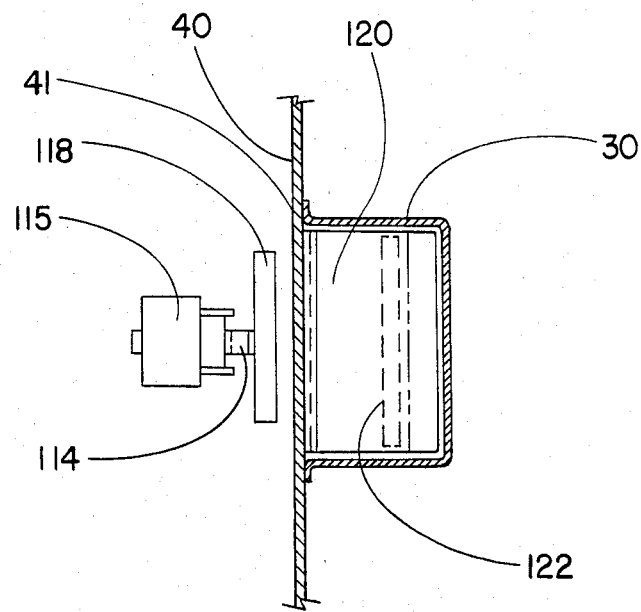
FIG. 4 is a top plan view of the present invention illustrated in FIG. 3.
Figure 5:
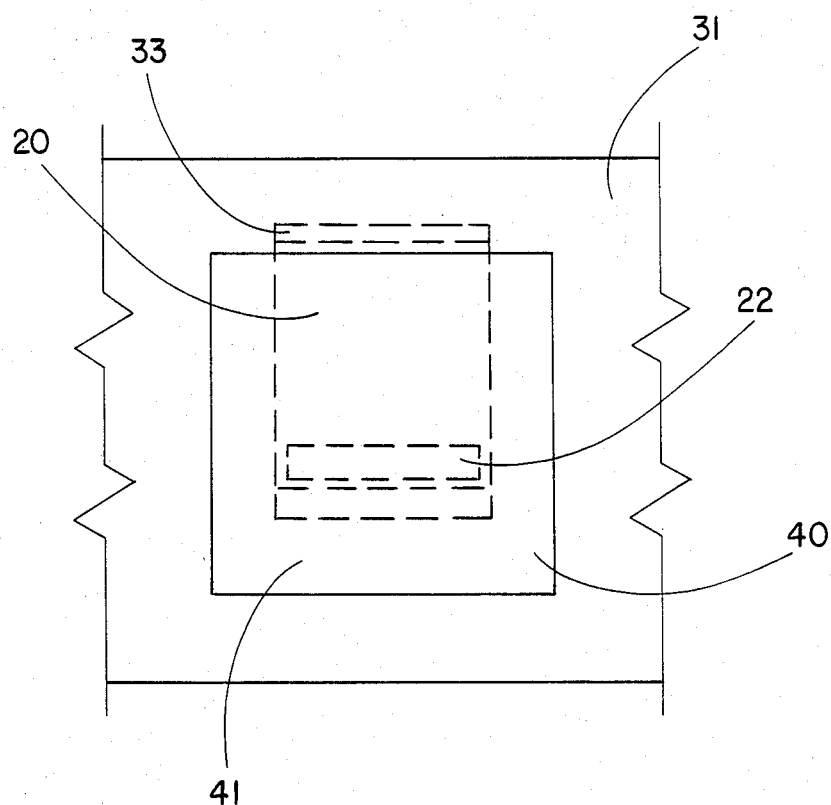
FIG. 5 is a back view of the present invention looking into the vertical tube illustrated in FIG. 3.

A second embodiment illustrated in FIGS. 3, 4 and 5 is affixed to the bin wall 31. Its hinge 33 is attached directly to the inside of the bin wall 31. The shape and positioning of plate 120 and magnet 122 may remain the same as those described for the first embodiment. In the second embodiment the tube 30 or other like design of nonferrous material and attached directly to the bin wall 31. For bins constructed of ferromagnetic material a window 40 may be cut out of the bin wall 31 and replaced by a nonferromagnetic sheet 41. In this second embodiment the first magnet 122 swings towards the sheet 41 to an open position in response to the presence of pulverulent fluent material within the tube 30. On the outside of the bin wall 31 opposite the sheet 41 are positioned the control components to be described below. In the second embodiment these components are on the exterior of the bin and not exposed to the abrasive action of the pulverulent fluent material.

Two bin level detector and filling switches as those described in the second embodiment may be used in conjunction as high and low limit sensors and control devices within a bin. This eliminates the need for any tube within the bin. A bin level detector and filling switch as described in this embodiment initiates the filling of the bin once the pulverulent fluent material falls below its pressure plate 120. The filling of the bin is terminated when the pressure plate 120 of a second bin level detector and filling switch, which is placed higher than the first, is depressed.

In both embodiments illustrated the first magnet 22 or 122 and the second magnet 18 or 118 are positioned opposite one another with their like poles aligned to repulse each other. In this manner a biasing is established between the magnets. When a pulverulent material flows downwardly through either vertical tube 12 or 30, plate 20 or 120 is depressed. The increased repulsive magnetic force of the first magnet 22 or 122 against the second magnet 18 or 118 is applied by the second magnet to operate a control device such as electrical switch 15 or 115. Gravity or another means is used to urge the second magnet 18 or 118 to a forward position toward the first magnet 22 or 122. This establishes a biasing between the magnets that causes plate 20 or 120 to assume a closed position whenever pulverulent material is absent from the tube 12 or 30. When pulverulent material is present and depresses plate 22 or 122 to an open position the repulsive magnetic force between the magnets must be sufficient to urge the second magnet 18 or 118 to an aft position thus operating the control device.

In either of the two embodiments illustrated, the second magnet 18 or 118 is affixed to a lever 14 or 114. The weight of the second magnet 18 or 118 causes the lever to pivot on hinge 22 or 122 and to fall to a forward position toward the vertical tube 12 or 30 and increases the repulsive force applied to the first magnet 22 or 122 so that plate 20 or 120 swings outward from a vertical open position to a closed position. This occurs when the bin is in need of refilling and the level of the pulverulent material within the bin is below the bottom of tube 12 or 30 and has flowed out of the tube. With both the first magnet 22 or 122 and the second magnet 18 or 118 biased and holding plate 20 or 120 in the closed position, lever 14 or 114 will be in a forward position illustrated by FIGS. 2 and 3. Contacts of an electrical switch 15 or 115 may be either opened or closed to control an alarm, a bin refilling mechanism or some other function.

When bin 11 is full, the pulverulent fluent material will spill over the top of either vertical tube 12 or 30, fill the tube and depress plate 20 to its open position as illustrated in FIG. 2 or FIG. 3. The magnetic force of the first magnet 22 repulsing the biased magnetic force of the second magnet 18 will force the second magnet 18 away from the vertical tube 12 or 30 and cause lever 14 to assume an aft position as illustrated in FIG. 2 or FIG. 3 and reverse the control function of electrical switch 15.

The use of the second magnet 18 is not limited to the operation of a lever or mechanical switch but may also function in bias with the first magnet 22 when attached to other devices including a switch operated by a plunger or a microswitch. Electrical signals may be transmitted through wire 17 connected to electrical switch 15 at contacts 19A and 19B.

This bin level detector and filling switch may be used to control the operation of bin filling equipment such as that used to fill a grain hopper from a master storage grain bin in the feeding of livestock. Additionally, a bin level detector and filling switch as that described above may be positioned in a master bin to prevent the operation of filling mechanisms when the master bin is empty, thus preventing the danger of their overheating or the wasted use of energy. Other mechanisms or equipment may also be controlled by the use of such a device including a low bin level light or alarm.

An additional use of this bin level detector and filling switch is to provide a low level signal device. In this function the alternative embodiment of the invention not having a tube is placed near the bottom of a bin below the point at which refilling of the bin would commence. If no pulverulent fluent material is available to refill the bin, this low level switch will signal the shut off of the filling mechanisms when the level of the pulverulent fluent material is below the position of its plate 120. A switch in this position could simultaneously actuate a warning device to signal that the bin is near empty.

While the preferred embodiments of the present invention have been illustrated and described in detail, it will be understood that various modifications in the details of construction and design may be made without departing from the spirit of the invention or the scope of the following claims.

I claim:

1. A bin level detector and control device comprising:
   (a) a vertical tube mounted within a bin;
   (b) a movable plate with an upper end and a lower end, said upper end mounted with a hinge inside the vertical tube within said bin, said plate having an open position and a closed position extending into said tube into close proximity to all the surrounding interior tube walls and holding an attached first magnet at said lower end of said plate;

(c) a second magnet with its like pole opposite to and biased with said first magnet and mounted to a movable support means for moving said second magnet towards said first magnet to urge said plate into said closed position, said first magnet and said second magnet being separated by a solid sheet material; and (d) a control means linked to said second magnet for actuation by the increased force applied to said second magnet by movement of said plate to said open position by a material flowing into said tube.

2. A bin level detector and control device as recited in claim 1 wherein said second magnet is attached to a lever pivotally mounted to operate an electrical switch.

3. A bin level detector and control device as recited in claim 1 wherein said second magnet is attached to a plunger-like device to operate an electrical switch.

4. A bin level detector and control device as recited in claim 1 wherein said control means is a microswitch connected to a control bin filling device.

5. A bin level detector and filling switch as recited in claim 1 wherein said second magnet is mounted on a pivotal lever such that gravity causes said second magnet to move towards said first magnet.

6. A bin level detector and control device as recited in claim 1 wherein said movement of said plate to said open position causes said control means to terminate operation of a bin filling mechanism.

* * * * *